(12) United States Patent
Tran et al.

(10) Patent No.: US 11,643,546 B2
(45) Date of Patent: May 9, 2023

(54) POLYMERIC COMPOSITIONS FOR OPTICAL FIBER CABLE COMPONENTS

(71) Applicants: Rohm and Haas Company, Collegeville, PA (US); Union Carbide Corporation, Midland, MI (US)

(72) Inventors: Michael Q. Tran, Wayne, PA (US); Mohamed Esseghir, Lawrenceville, NJ (US)

(73) Assignees: UNION CARBIDE CORPORATION, Seadrift, TX (US); ROHM AND HAAS COMPANY, Collegeville, PA (US)

( * ) Notice: Subject to any disclaimer, the term of this patent is extended or adjusted under 35 U.S.C. 154(b) by 314 days.

(21) Appl. No.: 16/643,166

(22) PCT Filed: Jul. 18, 2018

(86) PCT No.: PCT/US2018/042575
§ 371 (c)(1),
(2) Date: Feb. 28, 2020

(87) PCT Pub. No.: WO2019/050627
PCT Pub. Date: Mar. 14, 2019

(65) Prior Publication Data
US 2020/0270449 A1 Aug. 27, 2020

Related U.S. Application Data (60) Provisional application No. 62/554,771, filed on Sep. 6, 2017.

(51) Int. Cl.
C08L 67/02 (2006.01)
C09D 167/02 (2006.01)
G02B 6/44 (2006.01)

(52) U.S. Cl.
CPC ............ C08L 67/02 (2013.01); C09D 167/02 (2013.01); G02B 6/443 (2013.01); G02B 6/4434 (2013.01); C08L 2203/206 (2013.01); C08L 2205/025 (2013.01); C08L 2205/035 (2013.01); C08L 2207/062 (2013.01); C08L 2207/066 (2013.01)

(58) Field of Classification Search
None
See application file for complete search history.

(56) References Cited

U.S. PATENT DOCUMENTS

| 4,303,771 | A | 12/1981 | Wagner et al. |
| 5,324,800 | A | 6/1994 | Welborn, Jr. et al. |
| 6,122,426 | A | 9/2000 | Ishikawa et al. |
| 7,346,257 | B2 | 3/2008 | Mumm et al. |
| 10,502,913 | B2 | 12/2019 | Harris et al. |
| 2004/0087751 | A1* | 5/2004 | Tau .......... C09K 3/10 526/348.1 |
| 2007/0224423 | A1* | 9/2007 | Lee .......... G02B 6/443 428/375 |
| 2008/0145009 | A1 | 6/2008 | Mumm et al. |
| 2009/0068429 | A1 | 3/2009 | Kmiec et al. |
| 2010/0120953 | A1 | 5/2010 | Aarts et al. |
| 2013/0287353 | A1 | 10/2013 | Molin et al. |
| 2015/0316736 | A1 | 11/2015 | Kachmar |
| 2015/0370023 | A1 | 12/2015 | Baca et al. |
| 2015/0378119 | A1 | 12/2015 | Granger et al. |
| 2016/0215130 | A1* | 7/2016 | Esseghir .......... G02B 6/4432 |
| 2018/0254126 | A1* | 9/2018 | Esseghir .......... H01B 7/365 |

FOREIGN PATENT DOCUMENTS

| CN | 1205443 | 1/1999 |
| CN | 103013060 | 4/2013 |
| EP | 0593254 | 1/1995 |
| IN | 201817036579 | 1/2019 |
| JP | 2011190391 | 9/2011 |
| JP | 2011222432 | 11/2011 |
| WO | 2015094516 | 6/2015 |
| WO | 2015102816 | 7/2015 |
| WO | 2017100175 | 6/2017 |
| WO | 2017152342 | 9/2017 |

OTHER PUBLICATIONS

Machine translation of Ningbo et al. CN103013060 (Year: 2013).*
Office Action First Examination Report from Indian 202017012216 application, dated Sep. 21, 2021.
Office Action from corresponding China 201880056969.7 application, dated Jun. 2, 2021.
Office Action Report Letter from corresponding Japanese Application No. 2020-512682 dated Aug. 16, 2022.
Office Action Report Letter from corresponding Korean Application No. 2020-7008339 dated Dec. 7, 2022.

* cited by examiner

Primary Examiner — Robert T Butcher (57) ABSTRACT

Polymeric compositions comprising a polybutylene terephthalate; a low-density polyolefin selected from a low-density polyethylene, a polyolefin elastomer, or combinations thereof; and a maleated ethylene-based polymer. Optical cable components fabricated from the polymeric composition. Optionally, the polymeric composition can further comprise one or more additives, such as a filler. The optical fiber cable components can be selected from buffer tubes, core tubes, and slotted core tubes, among others.

7 Claims, 2 Drawing Sheets

POLYMERIC COMPOSITIONS FOR OPTICAL FIBER CABLE COMPONENTS

REFERENCE TO RELATED APPLICATIONS

The present application claims the benefit of U.S. Provisional Application No. 62/554,771, filed on Sep. 6, 2017.

FIELD

Various embodiments of the present disclosure relate to polymeric compositions comprising polybutylene terephthalate; a low-density polyolefin selected from a low-density polyethylene, a polyolefin elastomer, or combinations thereof; and a maleated ethylene-based polymer. Additional embodiments relate to buffer-tube, core-tube, or slotted-core fiber optic cable components made from the polymeric compositions.

INTRODUCTION

Optical fibers efficiently transmit information at high rates and over long distances. These fibers are delicate and need to be protected. In practical application, a fiber optic cable protects the fibers from mechanical damage and/or adverse environmental conditions such as moisture exposure. For example, specific protective components include extruded buffer tubes, core tubes, and slotted core members.

Buffer tubes, also known as loose buffer tubes, are protection components used to house and protect optical fibers, such as in a cable. Typically, these loose buffer tubes are filled with a hydrocarbon gel or grease to suspend and protect the fiber from moisture and have stringent requirements for high crush resistance, resistance to micro-bending, low brittleness temperature, good grease compatibility, impact resistance, and low post-extrusion shrinkage. Still other buffer tubes may be dry-construction buffer tubes that do not employ hydrocarbon gels or grease. Materials used in the manufacture of the buffer tubes include polybutylene terephthalate ("PBT"), high-crystallinity polypropylene, and to a lesser extent high-density polyethylene. Although advances have been made in the field of buffer tubes, improvements are still desired.

SUMMARY

One embodiment is a polymeric composition, comprising:
a polybutylene terephthalate;
a low-density polyolefin selected from the group consisting of a low-density polyethylene,
a polyolefin elastomer, and mixtures thereof; and
a maleated ethylene-based polymer.

BRIEF DESCRIPTION OF THE DRAWINGS

Reference is made to the accompanying drawings in which.

DETAILED DESCRIPTION

Various embodiments of the present disclosure concern polymeric compositions comprising a polybutylene terephthalate ("PBT"), a low-density polyolefin, and a maleated ethylene-based polymer. Optionally, the polymeric composition can further comprise a high-density polyethylene. The polymeric composition may further optionally comprise one or more additives, such as a filler. Such polymeric compositions can be extruded to form optical fiber cable protective components.

Polybutylene Terephthalate

The PBT component of the polymeric composition can be any PBT known or hereafter discovered in the art. The PBT component of the polymeric composition can be prepared by any known or hereafter discovered methods in the art.

In one or more embodiments, the PBT can have a density in the range of from 1.26 to 1.41 g/cm$^3$, or from 1.30 to 1.35 g/cm$^3$. Polymer densities provided herein are determined according to ASTM International ("ASTM") method D792 at 23° C.

In one or more embodiments, the PBT can have a melt index ($I_2$) in the range of from 7 to 15 grams per 10 minutes ("g/10 min."), or from 8 to 10 g/10 min. Melt indices provided herein are determined according to ASTM method D1238. Melt indices for PBT are determined at 250° C. and 2.16 Kg (i.e., $I_2$).

In various embodiments, the PBT can be an extrusion-grade PBT. In alternate embodiments, the PBT can be an injection-molding-grade PBT. Injection-molding-grade PBTs are typically characterized by having lower molecular weight, as evidenced by relatively higher melt indices. Accordingly, in one or more embodiments, the PBT can have a melt index ($I_2$) of at least 10 g/10 min., at least 15 g/10 min., at least 20 g/10 min., at least 25 g/10 min., at least 30 g/10 min., at least 35 g/10 min., at least 40 g/10 min., or at least 45 g/10 min. In such embodiments, the PBT can have a melt index ($I_2$) of up to 75 g/10 min., up to 70 g/10 min., up to 65 g/10 min., up to 60 g/10 min., up to 55 g/10 min., or up to 50 g/10 min.

Examples of commercially available extrusion-grade PBTs include, but are not limited to, PBT-61008 from Suzhou Yingmao Plastics Company, Jiangsu, China; ULTRADUR™ B6550 from BASF, Ludwigshafen, Germany; CRASTIN™ 6129 NC010 from DuPont, Wilmington, Del., USA; and PBT VALOX™ 176 from Sabic Innovative Plastics, Pittsfield, Mass., USA. An example of a commercially available injection-molding-grade PBT includes, but is not limited to, CRASTIN™ 6134 from DuPont, Wilmington, Del., USA.

In one or more embodiments, the PBT can be present in the polymeric composition in an amount ranging from 15 to 85 weight percent ("wt %"), from 20 to 85 wt %, from 25 to 85 wt %, from 30 to 85 wt %, from 35 to 85 wt %, from 40 to 85 wt %, from 45 to 85 wt %, from 50 to 85 wt %, from 55 to 80 wt %, from 60 to 80 wt %, or from 65 to 80 wt % based on the combined weight of the PBT, the low-density polyolefin, and the maleated ethylene-based polymer. In various embodiments, the PBT can be present in the polymeric composition in an amount ranging from 10 to 85 wt %, from 15 to 85 wt %, from 20 to 85 wt %, from 25 to 85 wt %, from 30 to 85 wt %, from 35 to 85 wt %, from 40 to 85 wt %, from 45 to 85 wt %, from 50 to 85 wt %, from 55 to 85 wt %, from 60 to 80 wt %, or from 70 to 80 wt %, based on the total weight of the polymeric composition.

Low-Density Polyolefin

As noted above, one component of the polymeric compositions described herein is a low-density polyolefin. The low-density polyolefin is selected from the group consisting of a low-density polyethylene, a polyolefin elastomer, and mixtures thereof. As used herein, a "low-density" polyolefin has a density of less than 0.93 g/cm$^3$. Polymer densities provided herein are determined according to ASTM International ("ASTM") method D792, Test Method A. In various embodiments, the low-density polyolefin can have a density of less than 0.928 g/cm$^3$, less than 0.925 g/cm$^3$, less than 0.923 g/cm$^3$, or less than 0.920 g/cm$^3$. A "polyolefin" is a polymer prepared primarily from alpha-olefin monomers, but may include non-alpha-olefin comonomers. As used herein, "polymer" means a macromolecular compound prepared by reacting (i.e., polymerizing) monomers of the same or different type, and includes homopolymers and interpolymers. "Interpolymer" means a polymer prepared by the polymerization of at least two different monomer types. This generic term includes copolymers (usually employed to refer to polymers prepared from two different monomer types), and polymers prepared from more than two different monomer types (e.g., terpolymers (three different monomer types) and quaterpolymers (four different monomer types)). As used herein, "homopolymer" denotes a polymer comprising repeating units derived from a single monomer type, but does not exclude residual amounts of other components used in preparing the homopolymer, such as chain transfer agents.

As noted above, in one or more embodiments the low-density polyolefin can be a low-density polyethylene ("LDPE"). LDPEs are generally highly branched ethylene homopolymers, and can be prepared via high-pressure processes (i.e., HP-LDPE). LDPEs suitable for use herein can have a density ranging from 0.91 to less than 0.93 g/cm$^3$. In various embodiments, the LDPE can be a high-pressure LDPE having a density of at least 0.915 g/cm$^3$, but less than 0.93 g/cm$^3$, less than 0.925 g/cm$^3$, or less than 0.93 g/cm$^3$. LDPEs suitable for use herein can have a melt index ($I_2$) of less than 20 g/10 min., or ranging from 0.1 to 10 g/10 min., from 0.5 to 5 g/10min., from 1 to 3 g/10 min., or an I2 of 2 g/10 min. Melt indices provided herein are determined according to ASTM method D1238. Unless otherwise noted, melt indices are determined at 190° C. and 2.16 Kg (i.e., $I_2$). Generally, LDPEs have a broad molecular weight distribution ("MWD") resulting in a relatively high polydispersity index ("PDI;" ratio of weight-average molecular weight to number-average molecular weight).

Examples of suitable commercially available LDPEs include, but are not limited to, DFDA-1216 NT and AXELERON CX 1258 NT, both available from the Dow Chemical Company.

It is noted that the LDPEs suitable for use herein do not include linear-low-density polyethylene ("LLDPE"). As known to those skilled in the art, LDPEs and LLDPEs differ in both composition and properties. For instance, LLDPE is known to contain shorter chain branching and lacks the long chain branching and melt strength characteristics of LDPE. LLDPE generally has stronger mechanical properties, such as tensile strength and toughness; however, it is more difficult to process with a viscosity characterized by a lower shear thinning behavior compared to LDPE.

In various embodiments, the low-density polyolefin can be a polyolefin elastomer. As known in the art, an "elastomer" is a polymer that experiences large reversible deformations under relatively low stress. Elastomers can either be thermoplastic or thermoset. "Thermoplastic elastomers" are elastomers having thermoplastic properties. That is, thermoplastic elastomers are optionally molded or otherwise shaped and reprocessed at temperatures above their melting or softening point. The polyolefin elastomers suitable for use herein are thermoplastic elastomers.

A "polyolefin elastomer" is an elastomeric polymer containing residues of alpha-olefin ("α-olefin") monomers. In various embodiments, the polyolefin elastomers consist of only α-olefin monomer residues, including ethylene. Such polyolefin elastomers can be either homopolymers or interpolymers.

Polyolefin elastomers include both polyolefin homopolymers and interpolymers. Examples of polyolefin homopolymers are homopolymers of ethylene and propylene. Examples of polyolefin interpolymers are ethylene/α-olefin interpolymers and propylene/α-olefin interpolymers. In such embodiments, the α-olefin can be a $C_{3-20}$ linear, branched or cyclic α-olefin (for the propylene/α-olefin interpolymers, ethylene is considered an α-olefin). Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane. Illustrative polyolefin copolymers include ethylene/propylene, ethylene/butene, ethylene/1-hexene, ethylene/1-octene, and the like. Illustrative terpolymers include ethylene/propylene/1-octene, ethylene/propylene/butene, and ethylene/butene/1-octene. In an embodiment, the polyolefin elastomer is an ethylene/octene copolymer. Additionally, the copolymers can be random or blocky.

Polyolefin elastomers can also comprise one or more functional groups such as an unsaturated ester or acid or silane, and these elastomers (polyolefins) are well known and can be prepared by conventional high-pressure techniques. The unsaturated esters can be alkyl acrylates, alkyl methacrylates, or vinyl carboxylates. The alkyl groups can have 1 to 8 carbon atoms and preferably have 1 to 4 carbon atoms. The carboxylate groups can have 2 to 8 carbon atoms and preferably have 2 to 5 carbon atoms. The portion of the copolymer attributed to the ester comonomer can be in the range of 1 up to 50 percent by weight based on the weight of the copolymer. Examples of the acrylates and methacrylates are ethyl acrylate, methyl acrylate, methyl methacrylate, t-butyl acrylate, n-butyl acrylate, n-butyl methacrylate, and 2-ethylhexyl acrylate. Examples of the vinyl carboxylates are vinyl acetate, vinyl propionate, and vinyl butanoate. Examples of the unsaturated acids include acrylic acids or maleic acids. One example of an unsaturated silane is vinyl trialkoxysilane.

Functional groups can also be included in the polyolefin elastomer through grafting which can be accomplished as is commonly known in the art. In one embodiment, grafting may occur by way of free radical functionalization which typically includes melt blending the polyolefin elastomer, a free radical initiator (such as a peroxide or the like), and a compound containing a functional group. During melt blending, the free radical initiator reacts (reactive melt blending) with the polyolefin elastomer to form polymer radicals. The compound containing a functional group bonds to the backbone of the polymer radicals to form a functionalized polymer. Exemplary compounds containing functional groups include but are not limited to alkoxysilanes (e.g., vinyl trimethoxysilane, vinyl triethoxysilane) and vinyl carboxylic acids and anhydrides (e.g., maleic anhydride).

Commercial examples of polyolefin elastomers useful herein include very-low-density polyethylene ("VLDPE") (e.g., FLEXOMER™ ethylene/1-hexene polyethylene made by The Dow Chemical Company), homogeneously branched, linear ethylene/α-olefin copolymers (e.g.

TAFMER™ by Mitsui Petrochemicals Company Limited and EXACT™ by Exxon Chemical Company), and homogeneously branched, substantially linear ethylene/α-olefin copolymers (e.g., AFFINITY™ and ENGAGE™ polyethylene available from The Dow Chemical Company).

Polyolefin elastomers suitable for use herein also include propylene-, butene-, and other alkene-based copolymers. Such copolymers comprise a majority (i.e., greater than 50 weight percent ("wt %")) of units derived from the alkene (e.g., propylene) and a minority of units derived from another α-olefin (including ethylene). In an embodiment, the polyolefin elastomer includes a propylene-based copolymer. In further embodiments, the polyolefin elastomer comprises a propylene-ethylene copolymer. Exemplary propylene-based copolymers useful herein include VERSIFY™ polymers available from The Dow Chemical Company, and VISTAMAXX™ polymers available from ExxonMobil Chemical Company.

Polyolefin elastomers can also include ethylene-propylene-diene monomer ("EPDM") elastomers and chlorinated polyethylenes ("CPE"). Commercial examples of suitable EPDMs include NORDEL™ EPDMs, available from The Dow Chemical Company. Commercial examples of suitable CPEs include TYRIN™ CPEs, available from The Dow Chemical Company.

In one or more embodiments, the polyolefin elastomer is selected from the group consisting of ethylene-based polyolefin elastomers, propylene-based polyolefin elastomers, and combinations thereof. In such embodiments, the ethylene-based polyolefin elastomer can have an ethylene content of greater than 50 wt %, or greater than 60 wt %, based on the entire weight of the ethylene-based polyolefin elastomer, with the balance consisting of one or more alpha-olefin monomers. Additionally, the ethylene-based polyolefin elastomer can have an ethylene content ranging from greater than 50 to 90 wt %, or from 60 to 75 wt %, based on the entire weight of the ethylene-based polyolefin elastomer, with the balance consisting of one or more alpha-olefin monomers. In various embodiments, the alpha-olefin monomer is octene.

Furthermore, when the polyolefin elastomer is propylene-based, it can have a propylene content of greater than 50 wt %, greater than 70 wt %, or greater than 90 wt %, based on the entire weight of the propylene-based polyolefin elastomer, with the balance consisting of one or more alpha-olefin monomers (including ethylene). Additionally, the propylene-based polyolefin elastomer can have a propylene content ranging from greater than 50 to 99 wt %, from 70 to 98 wt %, or from 90 to 97 wt %, based on the entire weight of the propylene-based polyolefin elastomer, with the balance consisting of one or more alpha-olefin monomers (including ethylene). In various embodiments, when the polyolefin elastomer is propylene-based, the alpha-olefin comonomer is ethylene.

Polyolefin elastomers suitable for use herein can have a number-average molecular weight ("Mn") of greater than 2,000 g/mol, at least 4,000 g/mol, or at least 5,000 g/mol. Additionally, the polyolefin elastomers can have an Mn in the range of from 2,000 to 50,000 g/mol, from 4,000 to 40,000 g/mol, from 5,000 to 30,000 g/mol, from 7,000 to 20,000 g/mol, or from 7,000 to 15,000 g/mol. Mn is determined according to gel-permeation chromatography.

Polyolefin elastomers suitable for use herein can have a weight-average molecular weight ("Mw") ranging from 1,000 to 100,000 g/mol, from 5,000 to 50,000 g/mol, or from 8,000 to 30,000 g/mol. Mw is determined according to gel-permeation chromatography.

Polyolefin elastomers suitable for use herein can have a polydispersity index ("PDI" or "Mw/Mn") ranging from 0.2 to 20, from 0.5 to 10, or from 1 to 5. PDI is determined according to gel-permeation chromatography.

Polyolefin elastomers suitable for use herein can have a density of less than 0.91 $g/cm^3$ or less than 0.90 $g/cm^3$. Additionally, the polyolefin elastomers can have a density of at least 0.85 $g/cm^3$ or at least 0.86 $g/cm^3$. Density is determined according to ASTM D 792.

In an embodiment, the low-density polyolefin can comprise a combination of any two or more of the above-described LDPEs and polyolefin elastomers.

In one or more embodiments, the low-density polyolefin can be present in the polymeric composition in an amount ranging from 10 to 45 weight percent ("wt %"), from 15 to 35 wt %, from 15 to 30 wt %, or from 17 to 27 wt %, based on the combined weight of the PBT, the low-density polyolefin, and the maleated ethylene-based polymer. In various embodiments, the ethylene-based polymer can be present in the polymeric composition in an amount ranging from 10 to 45 wt %, from 15 to 35 wt %, or from 15 to 20 wt %, based on the total weight of the polymeric composition.

Maleated Ethylene-Based Polymer

As noted above, the polymeric composition further comprises a maleated ethylene-based polymer. As used herein, the term "maleated" indicates a polymer (e.g., an ethylene-based polymer) that has been modified to incorporate a maleic anhydride monomer. Maleic anhydride can be incorporated into the ethylene-based polymer by any methods known or hereafter discovered in the art. For instance, the maleic anhydride can be copolymerized with ethylene and other monomers (if present) to prepare an interpolymer having maleic anhydride residues incorporated into the polymer backbone. Alternatively, the maleic anhydride can be graft-polymerized to the ethylene-based polymer. Techniques for copolymerizing and graft polymerizing are known in the art.

In one or more embodiments, the maleated ethylene-based polymer is an ethylene-based polymer having maleic anhydride grafted thereon. As used herein, "ethylene-based" polymers are polymers prepared from ethylene monomers as the primary (i.e., greater than 50 weight percent ("wt %")) monomer component, though other co-monomers may also be employed. In various embodiments, the pre-maleated ethylene-based polymer can be an ethylene homopolymer.

In an embodiment, the pre-maleated ethylene-based polymer can be an ethylene/alpha-olefin ("α olefin") interpolymer having an α-olefin content of at least 1 wt %, at least 5 wt %, at least 10 wt %, at least 15 wt %, at least 20 wt %, or at least 25 wt % based on the entire interpolymer weight. These interpolymers can have an α-olefin content of less than 50 wt %, less than 45 wt %, less than 40 wt %, or less than 35 wt % based on the entire interpolymer weight. When an α-olefin is employed, the α-olefin can be a $C_{3-20}$ (i.e., having 3 to 20 carbon atoms) linear, branched or cyclic α-olefin. Examples of $C_{3-20}$ α-olefins include propene, 1 butene, 4-methyl-1-pentene, 1-hexene, 1-octene, 1-decene, 1 dodecene, 1 tetradecene, 1 hexadecene, and 1-octadecene. The α-olefins can also have a cyclic structure such as cyclohexane or cyclopentane, resulting in an α-olefin such as 3 cyclohexyl-1-propene (allyl cyclohexane) and vinyl cyclohexane. Illustrative ethylene/α-olefin interpolymers include ethylene/propylene, ethylene/1-butene, ethylene/1 hexene, ethylene/1 octene, ethylene/propylene/1-octene, ethylene/propylene/1-butene, and ethylene/1-butene/1 octene.

In various embodiments, the pre-maleated ethylene-based polymer can be used alone or in combination with one or more other types of ethylene-based polymers (e.g., a blend of two or more ethylene-based polymers that differ from one another by monomer composition and content, catalytic method of preparation, etc). If a blend of ethylene-based polymers is employed, the polymers can be blended by any in-reactor or post-reactor process. In various embodiments, the starting ethylene-based polymer can be selected from a linear-low density polyethylene ("LLDPE"), a medium-density polyethylene ("MDPE"), and a high-density polyethylene ("HDPE").

LLDPEs are generally ethylene-based polymers having a heterogeneous distribution of comonomer (e.g., α-olefin monomer), and are characterized by short-chain branching. For example, LLDPEs can be copolymers of ethylene and α-olefin monomers, such as those described above. LLDPEs suitable for use herein can have a density ranging from 0.916 to 0.925 g/cm$^3$. LLDPEs suitable for use herein can have a melt index ($I_2$) ranging from 1 to 20 g/10 min., or from 3 to 8 g/10 min.

MDPEs are ethylene-based polymers having densities generally ranging from 0.926 to 0.950 g/cm$^3$. In various embodiments, the MDPE can have a density ranging from 0.930 to 0.949 g/cm$^3$, or from 0.940 to 0.949 g/cm$^3$. The MDPE can have a melt index ($I_2$) ranging from 0.1 g/10 min, or 0.2 g/10 min, or 0.3 g/10 min, or 0.4 g/10 min, up to 5.0 g/10 min, or 4.0 g/10 min, or, 3.0 g/10 min or 2.0 g/10 min, or 1.0 g/10 min, as determined according to ASTM D-1238 (190° C./2.16 kg).

HDPEs are ethylene-based polymers having densities greater than 0.940 g/cm$^3$. In an embodiment, the HDPE has a density from 0.945 to 0.97 g/cm$^3$, as determined according to ASTM D-792. The HDPE can have a peak melting temperature of at least 130° C., or from 132 to 134° C. The HDPE can have a melt index ($I_2$) ranging from 0.1 g/10 min, or 0.2 g/10 min, or 0.3 g/10 min, or 0.4 g/10 min, up to 5.0 g/10 min, or 4.0 g/10 min, or, 3.0 g/10 min or 2.0 g/10 min, or 1.0 g/10 min, or 0.5 g/10 min, as determined according to ASTM D-1238 (190° C. / 2.16 kg). Also, the HDPE can have a PDI in the range of from 1.0 to 30.0, or in the range of from 2.0 to 15.0, as determined by gel permeation chromatography.

In one or more embodiments, the pre-maleated ethylene-based polymer is a high-density polyethylene.

The maleated ethylene-based polymer has a density of at least 0.93 g/cm$^3$. In various embodiments, the maleated ethylene-based polymer can have a density of greater than 0.93 g/cm$^3$, at least 0.933 g/cm$^3$, at least 0.935 g/cm$^3$, at least 0.937 g/cm$^3$, at least 0.94 g/cm$^3$, at least 0.943 g/cm$^3$, at least 0.945 g/cm$^3$, at least 0.947 g/cm$^3$, or at least 0.95 g/cm$^3$. In one or more embodiments, the maleated ethylene-based polymer can have a density up to 0.97 g/cm$^3$, up to 0.965 g/cm$^3$, or up to 0.96 g/cm$^3$.

In various embodiments, the maleated ethylene-based polymer can have a melt index ranging from 0.1 to 10 g/10 min., from 0.2 to 8 g/10 min., or from 0.5 to 5 g/10 min.

The maleated ethylene-based polymer can have a maleic anhydride content of at least 0.25 wt %, or in an amount ranging from 0.25 to 2.5 wt %, or from 0.5 to 1.5 wt % based on the total weight of the maleated ethylene-based polymer. Maleic anhydride concentrations are determined by titration analysis, FTIR analysis or any other appropriate method. One titration method takes dried resin and titrates with 0.02N KOH to determine the amount of maleic anhydride. The dried polymers are titrated by dissolving 0.3 to 0.5 grams of maleated polymer in about 150 mL of refluxing xylene. Upon complete dissolution, deionized water (four drops) is added to the solution and the solution is refluxed for 1 hour. Next, 1% thymol blue (a few drops) is added to the solution and the solution is over titrated with 0.02N KOH in ethanol as indicated by the formation of a purple color. The solution is then back-titrated to a yellow endpoint with 0.05N HCl in isopropanol.

In one or more embodiments, the maleated ethylene-based polymer can be present in the polymeric composition in an amount ranging from greater than 0 to 25 wt %, from greater than 0 to 15 wt %, from greater than zero to 10 wt %, from greater than 0 to 5 wt %, from 0.01 to 2.5 wt %, or from 0.1 to 1 wt %, based on the combined weight of the PBT, the low-density polyolefin, and the maleated ethylene-based polymer. In various embodiments, the maleated ethylene-based polymer can be present in the polymeric composition in an amount ranging from greater than 0 to 25 wt %, from greater than 0 to 15 wt %, from greater than zero to 10 wt %, from greater than 0 to 5 wt %, from 0.01 to 4 wt %, from 0.1 to 3 wt %, or from 0.5 to 2 wt %, based on the total weight of the polymeric composition.

Examples of suitable commercially available maleated ethylene-based polymer include, but are not limited to, AMPLIFY™ TY1053H, AMPLIFY™ GR204, and AMPLIFY™ GR205 available from The Dow Chemical Company, Midland, Mich., USA; BYNEL™-4000 series and FUSABOND™ P series products, available from DuPont, Wilmington, Del., USA; OREVAC™ grafted polyethylenes, available from Arkema, Colombes, France; and POLYBOND™ 3000 series, available from Addivant, Danbury, Conn., USA.

Optional Higher Density Ethylene-Based Polymer

In one or more embodiments, the polymeric composition can optionally further comprise a higher density ethylene-based polymer. Such higher density ethylene-based polymers include medium-density polyethylenes and high-density polyethylenes.

In an embodiment, the ethylene-based polymer can be a medium-density polyethylene ("MDPE"). MDPEs are ethylene-based polymers having densities generally ranging from 0.926 to 0.940 g/cm$^3$. However, for the present application, if an MDPE is employed it should have a density of at least 0.93 g/cm$^3$. In various embodiments, the MDPE can have a density ranging from 0.930 to 0.939 g/cm$^3$. The MDPE can have a melt index ($I_2$) ranging from 0.1 g/10 min, or 0.2 g/10 min, or 0.3 g/10 min, or 0.4 g/10 min, up to 5.0 g/10 min, or 4.0 g/10 min, or, 3.0 g/10 min or 2.0 g/10 min, or 1.0 g/10 min.

In one or more embodiments, the ethylene-based polymer can be a high-density polyethylene ("HDPE"). The high-density polyethylene suitable for use herein can be any high-density polyethylene known or hereafter discovered in the art. As known to those of ordinary skill in the art, HDPEs are ethylene-based polymers having densities of at least 0.940 g/cm$^3$. In an embodiment, the HDPE can have a density from 0.940 to 0.970 g/cm$^3$, from 0.940 to 0.965 g/cm$^3$, or from 0.945 to 0.965 g/cm$^3$. The HDPE can have a peak melting temperature of at least 124° C., or from 124 to 135° C. The HDPE can have a melt index ($I_2$) ranging from 0.1 grams per 10 minutes ("g/10 min."), or 0.2 g/10 min., or 0.3 g/10 min., or 0.4 g/10 min., up to 66.0 g/10 min., or 20.0 g/10 min., or 15.0 g/10 min., or, 10.0 g/10 min. or 5.0 g/10 min., or 1.0 g/10 min., or 0.5 g/10 min. Also, the HDPE can have a polydispersity index ("PDI") in the range of from 1.0 to 30.0, or in the range of from 2.0 to 15.0, as determined by gel permeation chromatography.

The HDPE suitable for use herein can be either unimodal or bimodal. As used herein, "unimodal" denotes an HDPE having a molecular weight distribution ("MWD") such that its gel permeation chromatography ("GPC") curve exhibits only a single peak with no discernible second peak, or even a shoulder or hump, relative to such single peak. In contrast, as used herein, "bimodal" means that the MWD in a GPC curve exhibits the presence of two component polymers, such as by having two peaks or where one component may be indicated by a hump, shoulder, or tail relative to the peak of the other component polymer. In various embodiments, the HDPE is unimodal. In other embodiments, the HDPE is bimodal.

Preparation methods for unimodal HDPEs are well known in the art. Any methods known or hereafter discovered for preparing a unimodal HDPE having the desired properties may be employed for making the unimodal HDPE. A suitable preparation method for making the unimodal HDPE can be found, for example, in U.S. Pat. Nos. 4,303,771 or 5,324,800.

An example of a commercially available unimodal HDPE includes, but is not limited to, DGDL-3364NT, available from The Dow Chemical Company, Midland, Mich., USA.

When the HDPE employed is a bimodal HDPE, such HDPE can comprise a first polymeric component and a second polymeric component. In various embodiments, the first component can be an ethylene-based polymer; for example, the first component can be a high-molecular-weight ethylene homopolymer or ethylene/alpha-olefin copolymer. The first component may comprise any amount of one or more alpha-olefin copolymers. For example, the first component can comprise less than 10 wt % of one or more alpha-olefin comonomers, based on the total first component weight. The first component may comprise any amount of ethylene; for example, the first component can comprise at least 90 wt % of ethylene, or at least 95 wt % of ethylene, based on the total first component weight.

The alpha-olefin comonomers present in the first component of the bimodal HDPE typically have no more than 20 carbon atoms. For example, the alpha-olefin comonomers may have from 3 to 10 carbon atoms, or from 3 to 8 carbon atoms. Exemplary alpha-olefin comonomers include, but are not limited to, propylene, 1-butene, 1-pentene, 1-hexene, 1-heptene, 1-octene, 1-nonene, 1-decene, and 4-methyl-1-pentene. In an embodiment, the alpha-olefin comonomers can be selected from the group consisting of propylene, 1-butene, 1-hexene, and 1-octene. In other embodiments, the alpha-olefin comonomers can be selected from the group consisting of 1-hexene and 1-octene.

The first component of the bimodal HDPE can have a density in the range of from 0.915 to 0.940 g/cm$^3$, from 0.920 to 0.940 g/cm$^3$, or from 0.921 to 0.936 g/cm$^3$. The first component can have a melt index ($I_{21.6}$) in the range of from 0.5 to 10 g/10 min., from 1 to 7 g/10 min., or from 1.3 to 5 g/10 min. The first component can have a molecular weight in the range of from 150,000 to 375,000 g/mol, from 175,000 to 375,000 g/mol, or from 200,000 to 375,000 g/mol.

The second polymeric component of the bimodal HDPE can be an ethylene-based polymer; for example, the second component can be a low-molecular-weight ethylene homopolymer. The ethylene homopolymer may contain trace amounts of contaminate comonomers, for example alpha-olefin comonomers. In various embodiments, the second component can comprise less than 1 wt % of one or more alpha-olefin comonomers, based on the weight of the second component. For example, the second component may comprise from 0.0001 to 1.00 wt % of one or more alpha-olefin comonomers, or from 0.001 to 1.00 percent by weight of one or more alpha-olefin comonomers. The second component can comprise at least 99 wt % of ethylene, or in the range of from 99.5 to 100 wt % of ethylene, based on the weight of the second component.

The second component of the bimodal HDPE can have a density in the range of from 0.965 to 0.980 g/cm$^3$, or from 0.970 to 0.975 g/cm$^3$. The second component can have a melt index ($I_2$) in the range of from 50 to 1,500 g/10 min., from 200 to 1,500 g/10 min., or from 500 to 1,500 g/10 min. The second component can have a molecular weight in the range of 12,000 to 40,000 g/mol, from 15,000 to 40,000 g/mol, or from 20,000 to 40,000 g/mol.

Preparation methods for bimodal HDPEs are well known in the art. Any methods known or hereafter discovered for preparing a bimodal HDPE having the desired properties may be employed for making the bimodal HDPE. A suitable preparation method for making bimodal HDPE can be found, for example, in U.S. Patent Application Publication No. 2009-0068429, paragraphs [0063] to [0086].

An example of a commercially available bimodal HDPE includes, but is not limited to, DMDA-1250NT, available from The Dow Chemical Company, Midland, Mich., USA.

Additives

In various embodiments, the polymeric composition can include one or more particulate fillers, such as glass fibers or various mineral fillers including nano-composites. Fillers, especially those with elongated or platelet-shaped particles providing a higher aspect ratio (length/thickness), may improve modulus and post-extrusion shrinkage characteristics. In various embodiments, the filler or fillers can have a median size or $d_{50\%}$ of less than 20 μm, less than 10 μm, or less than 5 μm. Suitable fillers may also be surface treated to facilitate wetting or dispersion in the polymeric composition. Specific examples of suitable fillers include, but are not limited to, calcium carbonate, silica, quartz, fused quartz, talc, mica, clay, kaolin, wollastonite, feldspar, aluminum hydroxide, carbon black, and graphite. Fillers may be included in the polymeric composition in an amount ranging from 2 to 30 wt %, or from 5 to 30 wt % based on the total weight of the polymeric composition.

In various embodiments, a nucleating agent can be employed in the polymeric composition. Examples of suitable nucleating agents include ADK NA-11, available commercially from Asahi Denim Kokai, and HYPERFORM™ HPN-20E, available from Milliken Chemical. Persons of ordinary skill in the art can readily identify other useful nucleating agents. The nucleating agents can be included in the polymeric composition in amounts ranging from 0.08 to 0.3 wt %, from 0.09 to 0.25 wt %, or from 0.1 to 0.22 wt % based on the total polymeric composition weight.

When employed, the hydrocarbon oil can be present in the polymeric compositions in an amount ranging from 0.2 to 10 parts per hundred resin ("phr"), or from 0.3 to 3.0 phr based on 100 weight parts of all polymer components present in the polymeric composition. Higher-molecular-weight hydrocarbon oils are more preferable than low-molecular-weight hydrocarbon oils. In various embodiments, the hydrocarbon oil can have a viscosity greater than 400 centistokes as measured by ASTM D-445. Additionally, the hydrocarbon oil can have a specific gravity between 0.86 and 0.90 as measured by ASTM D-1250. Also, the hydrocarbon oil can have a flash point greater than 300° C. as measured by ASTM D-92. Furthermore, the hydrocarbon oil can have a pour point greater than −10° C. as measured by ASTM D-97. Moreover, the hydrocarbon oil can have an aniline point between 80 and 300° C. as measured by ASTM D-611.

The polymeric compositions may also contain other types of additives. Representative additives include, but are not limited to, antioxidants, cross-linking co-agents, cure boosters and scorch retardants, processing aids, coupling agents, ultraviolet stabilizers (including UV absorbers), antistatic agents, additional nucleating agents, slip agents, lubricants, viscosity control agents, tackifiers, anti-blocking agents, surfactants, extender oils, acid scavengers, flame retardants and metal deactivators. These additives are typically used in a conventional manner and in conventional amounts, e.g., from 0.01 phr or less to 20 phr or more based on 100 weight parts of all polymer components present in the polymeric composition.

Suitable UV light stabilizers include hindered amine light stabilizers ("HALS") and UV light absorber ("UVA") additives. Representative UVA additives include benzotriazole types such as Tinuvin 326 and Tinuvin 328 commercially available from Ciba, Inc. Blends of HAL's and UVA additives are also effective.

Examples of antioxidants include hindered phenols such as tetrakis[methylene(3,5-di-tert-butyl-4-hydroxyhydro-cinnamate)]methane; bis[beta-(3,5-ditert-butyl-4-hydroxybenzyl) methylcarboxyethyl)]-sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)-hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis(alpha, alpha-dimethylbenzyl)diphenylamine, diphenyl-p-phenylenediamine, mixed di-aryl-p-phenylenediamines, and other hindered amine anti-degradants or stabilizers.

Examples of processing aids include but are not limited to metal salts of carboxylic acids such as zinc stearate or calcium stearate; fatty acids such as stearic acid, oleic acid, or erucic acid; fatty amides such as stearamide, oleamide, erucamide, or N,N'-ethylene bis-stearamide; polyethylene wax; oxidized polyethylene wax; polymers of ethylene oxide; copolymers of ethylene oxide and propylene oxide; vegetable waxes; petroleum waxes; non-ionic surfactants; silicone fluids and polysiloxanes.

In various embodiments, the polymeric composition may also contain additional polymeric components. For example, in one or more embodiments, the polymeric composition may optionally contain an additional polymeric component selected from the group consisting of the above-described high-density polyethylene, a polyethylene terephthalate, a polyamide, and combinations of two or more thereof.

Compounding

In one or more embodiments, the components of the polymeric composition disclosed herein can be added to a batch or continuous mixer for melt blending. The components can be added in any order or first preparing one or more masterbatches for blending with the other components. Additives are usually blended with one or more other components before being added to the bulk resins and/or filler. In one embodiment, the additives can be added directly to the compounding line without the use of previously prepared masterbatches. Typically, melt blending is conducted at a temperature above the highest melting polymer but lower than the maximum compounding temperature of 285° C. The melt-blended composition can then either be delivered to an extruder or an injection-molding machine or passed through a die for shaping into the desired article, or converted to pellets, tape, strip or film or some other form for storage or to prepare the material for feeding to a next shaping or processing step. Optionally, if shaped into pellets or some similar configuration, then the pellets, etc. can be coated with an anti-block agent to facilitate handling while in storage.

Compounding of the compositions can be effected by standard equipment known to those skilled in the art. Examples of compounding equipment are internal batch mixers, such as a Banbury™ or Bolling™ internal mixer. Alternatively, continuous single, or twin screw, mixers can be used, such as Farrel™ continuous mixer, a Werner and Pfleiderer™ twin screw mixer, or a Buss™ kneading continuous extruder. The type of mixer utilized, and the operating conditions of the mixer, will affect properties of the composition such as viscosity, volume resistivity, and extruded surface smoothness.

The polymeric composition can exhibit a Young's modulus in the range of from 1,100 to 2,400 megapascals ("MPa"), from 1,200 to 2,350 MPa, or from 1,300 to 2,300 MPa. In certain embodiments, such as when the polymeric composition is intended for use in loose buffer tubes that may be in contact with a filling compound (e.g., an optic cable grease or gel), the polymeric composition can exhibit a Young's modulus in the range of from 1,100 to 1,700 megapascals ("MPa"), from 1,200 to 1,700 MPa, or from 1,300 to 1,650 MPa. In other embodiments, such as when the polymeric composition is intended for dry-construction buffer tubes, the polymeric composition can exhibit a Young's modulus in the range of from 1,900 to 2,400 MPa, from 1,950 to 2,350 MPa, or from 2,000 to 2,300 MPa. Young's modulus is determined according to the procedure described in the Test Methods section, below.

The polymeric composition can exhibit a maximum tensile stress in the range of from 30 to 43 MPa, from 31 to 39 MPa, or from 32 to 38 MPa. Maximum tensile stress is determined according to the procedure described in the Test Methods section, below.

In various embodiments, particularly in embodiments where the polymeric composition is intended for use in buffer tubes containing a hydrocarbon filling compound, the polymeric composition can exhibit a weight increase of less than 3 wt %, less than 2 wt %, less than 1 wt %, or less than 0.5 wt % when immersed in Info-gel LA 444 (a fiber-optic-cable buffer-tube filling compound) as further described in the Test Methods section, below. LA 444 is composed of at least about 70 wt % mineral oil and up to about 10 wt % styrene-butadiene-styrene block copolymer, and is commercially available from Honghui Corp., China.

After aging in LA 444 in the manner described in the Test Methods section, below, the polymeric composition can exhibit a grease-aged Young's modulus in the range of from 1,000 to 1,600 MPa, from 1,000 to 1,550 MPa, or from 1,050 to 1,550 MPa, as determined by the process described in the Test Methods section, below.

After aging in LA 444 in the manner described above, the polymeric composition can exhibit a grease-aged maximum tensile strength in the range of from 27 to 39 MPa, from 28 to 38 MPa, or from 29 to 38 MPa, as determined by the process described in the Test Methods section, below.

Optical Fiber Cable

In various embodiments, an optical fiber cable can be prepared that includes at least one extruded optical protective component made from the polymer compositions described herein and incorporating at least one optical fiber transmission medium.

Figure 1:
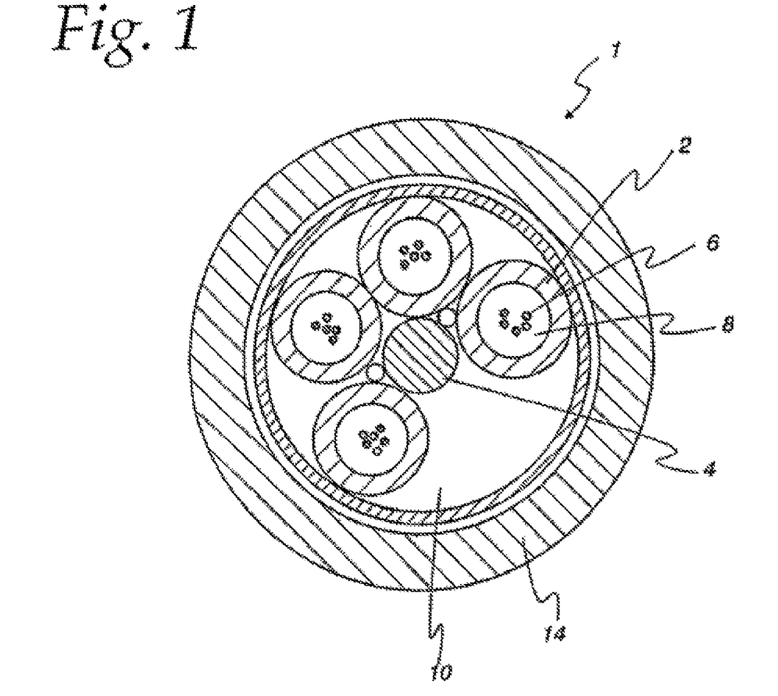
FIG. 1 shows a cross-sectional view of a loose buffer tube optical fiber cable.

A cross-sectional view of a common loose buffer tube optical fiber cable design is shown in FIG. 1. In this design of optical fiber cable 1, buffer tubes 2 are positioned radially around a central strength member 4, with a helical rotation to the tubes in the axial length. The helical rotation allows bending of the cable without significantly stretching the tube or the optic fibers 6.

If a reduced number of buffer tubes is required, then foamed filler rods can be used as low-cost spacers to occupy one or more buffer tube positions 10 to maintain cable geometry. The cable jacket 14 is generally fabricated from a polyethylene-based material.

The buffer tubes 2 are optionally filled with an optic cable grease or gel 8. Various gel compounds are available commercially, a number of which are hydrocarbon-based greases incorporating hydrocarbon oils. Others are polymer based and use a low viscosity polymer formulated with hydrocarbon oils and other additives for even lower viscosity for ease of filling. These greases and gels provide the suspension and protection needed in the immediate environment surrounding the fibers, including eliminating air space. This filling compound (also referred to as "gel" or "grease") provides a barrier against water penetration, which is detrimental to the optic transmission performance.

Generally two grades of filling greases or gels are used by the industry. For polyolefin type buffer tubes (e.g., polypropylene), high compatibility gels based on high purity poly-alpha olefin oils ("PAO") such as poly-isobutylene are used. On the other hand, given their excellent solvent resistance, PBT-based buffer tubes can use mineral oil based greases and gels. LT-410A and LT-390PP are two commercially available gels from Honghui Company, China. LT-390PP is a high purity grease designed for use with polypropylene buffer tubes, while LT-410A is designed for use with PBT buffer tubes. Another filling material is Thixotropic Gel LA 444, commercially available from Info-Gel and Indore Gel PVT. LTD. This material is marketed as compatible with thermoplastic materials commonly used in optical fiber cables such as PET, PBT and PA.

In either oil-based grease or polymer formulated with oil for lower viscosity, the hydrocarbon oils are typically low-molecular-weight hydrocarbon oils, which can be absorbed into polymeric buffer tubes. Absorption typically adversely affects the tube's mechanical properties, such as flexural modulus and crush resistance. A decrease in crush resistance renders the optic fibers more prone to mechanical stress, thereby permitting an increase in signal attenuation and increasing the possibility of catastrophic failure. Thus, good retention of modulus and crush resistance along with minimal oil absorption, commonly referred to as "grease compatibility," are important performance characteristics for polymeric materials to be used for making extruded optical protective component.

Many other buffer tube cable designs are possible. The size and materials of construction for the central strength and tensile member, the dimensions and number of buffer tubes, and the use of metallic armors and multiple layers of jacketing material are among the design elements.

Figure 2:
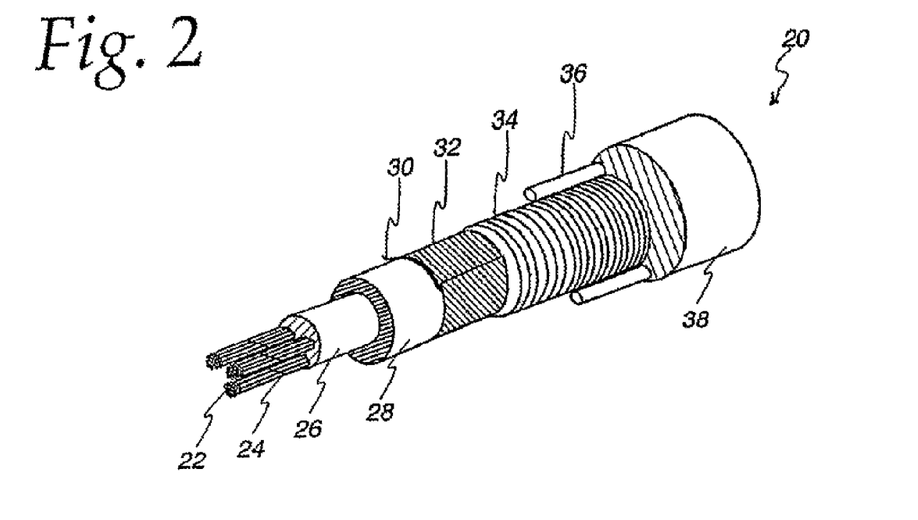
FIG. 2 shows a partial cutaway view of a core tube optical fiber cable.

A partial cutaway view of a typical core-tube optical fiber cable, also known as "central tube," is illustrated in FIG. 2. Bundles 24 of the optical fibers 22 are positioned near the center of the optical cable 20 within a central, cylindrical core tube 28. The bundles are embedded in a filling material 26. Water blocking tape 32 surrounds the ripcords 30, which are on the surface of the core tube. A corrugated, coated steel cylinder 34 surrounds the tape to protect the bundles. Wire strength members 36 provide the cable with strength and stiffness. A jacket 38, which is generally fabricated from a polyethylene-based material, surrounds all of the components. In this design, the mechanical functions are incorporated into the outer sheathing system composed of the core tube, polyolefin jacketing layers, tensile and compressive strength members, metallic armors, core wraps, water blocking components, and other components.

A core tube is typically larger in diameter than a buffer tube to accommodate bundles of fibers or the use of ribbon components containing the optic fibers. Color-coded binders are typically used to bundle and identify the fibers. A core tube can contain water blocking grease or super-absorbent polymer elements surrounding the optic fiber components. The optimal material characteristics for a core tube component are often similar to those of a buffer tube application.

Figure 3:
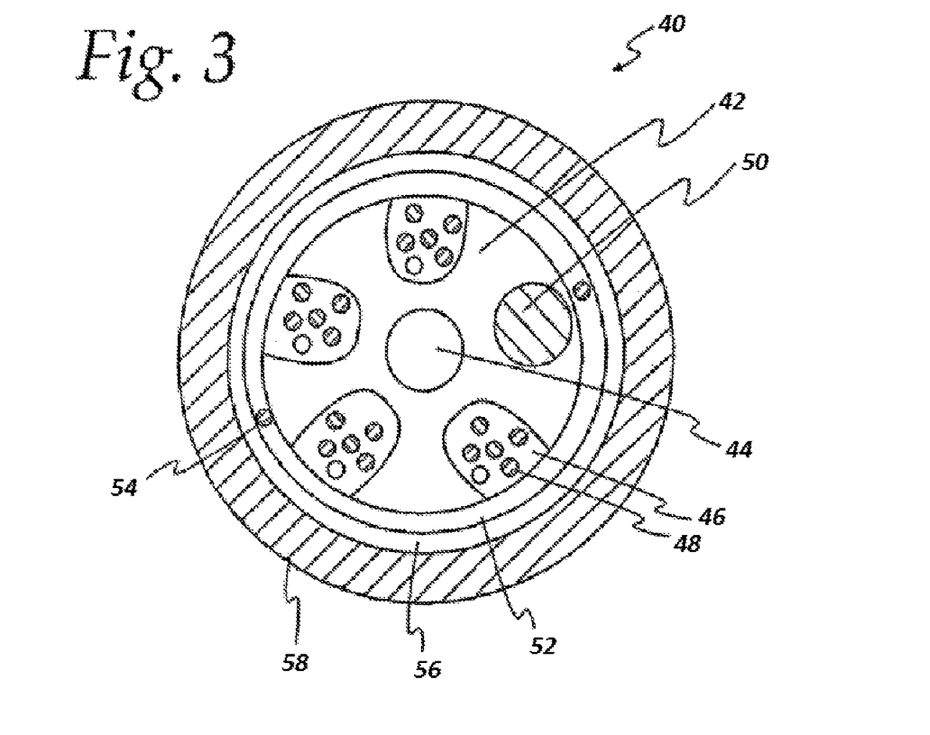
FIG. 3 shows a cross-sectional view of a slotted core optical fiber cable.

A cross-sectional view of a typical slotted-core cable design is shown in FIG. 3. The optical fiber cable 40 includes a jacket 58 and a slotted core 42, having a central member 44. The central member prevents buckling and controls axial shrinkage of the extruded slotted core profile shape. The jacket and the slotted core are typically made from a polyolefin-based material.

The slotted core has slots 46 in which optical fibers 48 are located. A filler rod 50 also may occupy one or more slots. A water-blocking layer 52, which may have one or more ripcords 54, surrounds the slotted core 42. A dielectric strength member layer 56 surrounds the water-blocking layer.

An optical fiber cable, such as those described above, can typically be made in a series of sequential manufacturing steps. Optical transmission fibers are generally manufactured in the initial step. The fibers can have a polymeric coating for mechanical protection. These fibers can be assembled into bundles or ribbon cable configurations or can be directly incorporated into the cable fabrication.

Optical protective components can be manufactured using an extrusion fabrication process. Typically, a single screw plasticating extruder discharges a fluxed and mixed polymer under pressure into a wire and cable cross-head. The cross-head turns the melt flow perpendicular to the extruder and shapes the flow into the molten component. For buffer and core tubes, one or more optic fibers or fiber assemblies and grease are fed into the back of the cross-head and exit the cross-head within the molten tube that is then cooled and solidified in a water trough system. This component is eventually collected as a finished component on a take-up reel.

To fabricate components comprised of two or more material layers, there typically would be separate plasticating extruders feeding the melt compositions into a multi-layer cross-head where it is shaped into the desired multi-layer construction.

Slotted core members and other profile extrusion components would typically be extruded in a similar profile extrusion process incorporating an appropriate shaping die, and then subsequently combined with the optical fiber components to fabricate the finished cable.

To control excess fiber length, a tensioning system is used to feed the fiber components into the tube fabrication process. In addition, component materials selection, the tube extrusion and cross-head equipment, and processing conditions are optimized to provide a finished component where post-extrusion shrinkage does not result in excessive slack in the optic fiber components.

The extruded optical protective components, along with other components, such as central components, armors, and wraps, are then subsequently processed in one or more steps to produce the finished cable construction. This typically includes processing on a cabling line where the components are assembled with a fabricating extruder/crosshead then used to apply the polymeric jacketing.

Test Methods

Density

Determine density according to ASTM D792 at 23° C.
Melt Index@ 190° C.

Melt index for polyolefins, or $I_2$, is measured in accordance with ASTM D1238, condition 190° C./2.16 kg, and is reported in grams eluted per 10 minutes. For polybutylene terephthalate, same conditions are utilized but with a temperature of 250° C.

Specimen Preparation

All specimens for tensile modulus, strain at yield, strain at break, and grease resistance are prepared by first drying blended materials (or PBT alone) in a vacuum oven at 70° C. for 16 hours, and subsequently compounded in an extruder or Brabender batch mixer and molded on a Wabash press at 250° C. (except for polyethylene, in which case the Wabash press is set at 190° C.) for 5 minutes preheat, 5 minutes at 3,000 psi, 5 minutes at 10,000 psi and then cooled under pressure between water-cooled platens into plaques. The molded plaques were then cut to the appropriate sized test specimens.

Tensile Properties

Determine tensile modulus, strain at yield, strain at break, stress at yield, and stress at break according to ASTM D638 Type V Tensile testing. Tensile properties are measured for fresh samples as well as select samples aged in LA 444 optical grease at 80° C. for 16 days in the manner described below for determining grease resistance.

Weight Gain (Grease Resistance)

The optical grease used for these studies is LA 444. Determine gel absorption by measuring the weight gain of each sample with time. Five tensile bars for each material or composition are weighed and then completely immersed on one side in the LA 444 optical grease in excess gel and held in an 80° C. air oven for 16 days. The tensile bars are wiped clean and then reweighed to calculate the amount of grease uptake.

Room Temperature Shrinkage

Determine shrinkage of extruded samples after aging at room temperature (21° C.). At least four (4) samples are measured for each material. Four-foot test specimens are prepared using a steel V channel to keep the samples straight and a ruler used for marking initial length measurements. The conductors are then stretched by clamping one end down of the conductor and drawing or pulling the other end of the conductor to separate the polymer tube from the copper. The resulting polymer tubes are aged for one (1) day at 21° C. The sample lengths are measured at the 1-day time and again at the 7-day time. The aged specimens are placed in the V-channel and the change in length measured using a caliper instrument with +/−0.0005 inch resolution. The average shrinkage value is reported. Separately, six (6), one-foot long specimens per sample are aged at 95° C. for four (4) hours and measured for shrinkage using the same method.

Hot Aged Shrinkage

Determine shrinkage of extruded samples after aging at elevated temperature (95° C.) for four (4) hours. At least four (4) samples are measured for each material. A four (4) foot test specimens are prepared using a steel V channel to keep the samples straight and a ruler used for one (1) foot initial length measurements. The conductors are then stretched by clamping one end down of the conductor and drawing or pulling the other end of the conductor to separate the polymer tube from the copper. The resulting polymer tube was cut into one (1) foot sections and aged for four (4) day at 95° C. The sample lengths are measured after allowing the specimens at least four (4) hours to cool to room temperature (21° C.). The aged specimens are placed in the V-channel and the change in length measured using a caliper instrument with +/−0.0005 inch resolution.

Extrusion Melt Breakage

Assessment of processability is performed using an internally developed melt breakage test. The test consists of running a Brabender single screw extruder (25 L/D PE screw fitted with a Maddock mixing section and a 0.060" orifice strand die) and drawing the melt through a water bath with increasing speed. The test is started at an extrusion screw speed of 10 RPM and the strand takeoff speed is gradually increased until either breakage occurs or the maximum takeoff speed is reached (230 ft/min). The screw speed is then decreased until breakage occurs or until a minimum of 5 RPM is reached, i.e., the lowest stable extruder throughput. The formulations which either do not break under these conditions or have a melt breakage speed of greater than 100 ft/min are considered a pass.

Materials

The following materials are employed in the Examples, below.

ULTRADUR™ B 6550 is an extrusion-grade PBT having a density of 1.30 g/cm³ and a melt index of 9.5 g/10 min. at 250° C., which is commercially available from BASF, Ludwigshafen, Germany.

CRASTIN™ 6134 is an injection-molding-grade PBT having a density of 1.30 g/cm³ and a melt index of 33.5 g/10 min. at 250° C., which is commercially available from E.I. du Pont de Nemours, Wilmington, Del., USA.

LDPE is a high-pressure low-density polyethylene having a density of 0.925 g/cm³ and a melt index of 2.4 g/10 min., which is commercially available under the trade name DFDA-1216 NT from The Dow Chemical Company, Midland, Mich., USA.

POE is a propylene-ethylene polyolefin elastomer having an ethylene content of 0.5 wt %. POE has a density of 0.8975 g/cm³ and a melt index (230° C./2.16 kg) of 8.0 g/10 min.

CONTINUUM™ DMDC-1250 NT 7 is a bimodal HDPE having a density of 0.955 g/cm³ and a melt index ($I_2$) of 1.5 g/10 min. at 190° C. DMDC-1250 NT is commercially available from The Dow Chemical Company, Midland, Mich., USA.

ASPUN™ 6850A is a fiber-grade LLDPE having a density of 0.955 g/cm³ and a melt index ($I_2$) of 30 g/10 min. at 190° C., and is commercially available from The Dow Chemical Company, Midland, Mich., USA.

ASPUN™ 6835A is a fiber-grade LLDPE having a density of 0.950 g/cm³ and a melt index ($I_2$) of 17 g/10 min. at 190° C., and is commercially available from The Dow Chemical Company, Midland, Mich., USA.

EXP LLDPE is an experimental fiber-grade LLDPE having a density of approximately 0.950 g/cm³ and a melt index ($I_2$) of 12 g/10 min. at 190° C.

ENGAGE™ 8480 is an ethylene/1-octene polyolefin elastomer having a density of 0.902 g/cm³ and a melt index of 1.0 g/10 min., which is commercially available from The Dow Chemical Company, Midland, Mich., USA.

AMPLIFY™ TY 1053H is a maleic-anhydride-grafted HDPE having a density of 0.958 g/cm³, a melt index of 2.0 g/10 min., and a maleic anhydride content of greater than 1.0 wt %, which is commercially available from The Dow Chemical Company, Midland, Mich., USA.

AMPLIFY™ GR 216 is a maleic-anhydride-grafted linear-low-density ethylene/octene copolymeric elastomer having a density of 0.875 g/cm³, a melt index of 1.3 g/10 min., and a maleic anhydride content of 0.79 wt %, which is commercially available from The Dow Chemical Company, Midland, Mich., USA.

EASTAR™ GN001 is an amorphous polyester having a density of 1.27 g/cm³, which is commercially available from Eastman Chemical Company, Kingsport, Tenn., USA.

PARALOID EXL 2314 is an acrylic impact modifier commercially available from The Dow Chemical Company, Midland, Mich., USA.

OPTIFIL™ JS is a surface-treated calcium carbonate having a mean particle size of 1 micron and a loose bulk density (ASTM C-110) of 30 lbs/ft³, which is commercially available from Huber Engineered Materials, Atlanta, Ga., USA.

NA-11A is a nucleating agent with the chemical name sodium 2,2'-methylene-bis-(4,6-di-tert-butylphenyl)phosphate (CAS No. 85209-91-2), which is commercially available from ADEKA Corporation, Tokyo, Japan.

IRGANOX™ 1010 is a sterically hindered phenolic antioxidant having the chemical name pentaerythritol tetrakis (3-(3,5-di-tert-butyl-4-hydroxyphenyl)propionate), which is commercially available from BASF, Ludwigshafen, Germany.

IRGAFOS™ 168 is a hydrolytically stable phosphite processing stabilizer having the chemical name tris(2,4-ditert-butylphenyl)phosphite, which is commercially available from BASF, Ludwigshafen, Germany.

LA 444 is a buffer-tube filling compound primarily composed of mineral oil and styrene-butadiene-styrene block copolymer, which is commercially available from Info-gel LLC, Charlotte, N.C., USA.

EXAMPLES

Example 1

Prepare four comparative samples (CS1-CS4) and two Samples (S1 and S2) using the formulations provided in Table 1, below. All samples having two or more components are prepared by blending all components in either a Brabender Plasticorder with roller rotors. The blends are melt mixed using a temperature set point of 245° C. The materials are added to the mixer at 25 rpm and the speed is increased to 50 rpm. The materials are then fluxed at 50 rpm for an additional 5 minutes. The resulting blend is removed from the mixer.

TABLE 1

Compositions of CS1-CS4, S1, and S2

|  | CS1 | CS2 | CS3 | CS4 | S1 | S2 |
| --- | --- | --- | --- | --- | --- | --- |
| ULTRADUR B 6550 (PBT) (wt %) | 100 | — | — | — | — | — |
| CRASTIN 6134 (PBT) (wt %) | — | 58.90 | 56.73 | 44.15 | 78.90 | 78.90 |
| LDPE (wt %) | — | — | — | — | 18.60 | — |
| POE (C3/C2 POE) (wt %) | — | — | — | — | — | 18.60 |
| DMDC 1250 (HDPE) (wt %) | — | 36.90 | 27.69 | 36.92 | — | — |
| AMPLIFY TY1053H (MAH-g-HDPE) (wt %) | — | 3.40 | 3.36 | 3.36 | 1.70 | 1.70 |
| ENGAGE 8480 (C2/C8 POE) (wt %) | — | — | 9.23 | — | — | — |
| EASTAR GN001 (wt %) | — | — | — | 14.72 | — | — |
| PARALOID EXL 2314 (wt %) | — | — | 2.14 | — | — | — |
| NA11 (wt %) | — | 0.20 | 0.21 | 0.21 | 0.20 | 0.20 |
| IRGANOX 1010 (wt %) | — | 0.40 | 0.43 | 0.43 | 0.40 | 0.40 |
| IRGAFOS 168 (wt %) | — | 0.20 | 0.21 | 0.21 | 0.20 | 0.20 |
| Total | 100 | 100 | 100 | 100 | 100 | 100 |

Analyze CS1-CS4, S1, and S2 according to the Test Methods provided above. The results are provided in Table 2, below.

TABLE 2

Properties of CS1-CS4, S1, and S2

|  | CS1 | CS2 | CS3 | CS4 | S1 | S2 |
| --- | --- | --- | --- | --- | --- | --- |
| Tensile Modulus (psi) | 377,098 | 193,745 | 161,213 | 186,549 | 190,311 | 193,745 |
| Stress at Yield (psi) | 5,798 | 5,422 | 4,476 | 5,328 | 5,237 | 5,422 |
| Strain at Yield (%) | 3.5 | 7 | 7 | 5 | 7 | 7 |
| Stress at Break (psi) | 5,798 | 4,905 | 1,564 | 2,170 | 5,052 | 6,118 |
| Strain at Break (%) | 22 | 21 | 13.4 | 28.6 | 7 | 5 |
| Heat Age Shrink (%) | 1.20 | 1.80 | — | — | 1.70 | 1.70 |
| Grease Resistance (wt %) | 0.02 | 0.10 | — | — | 0.35 | 0.20 |
| Δ Tensile Modulus (grease-aged) (%) | +3 | −23 | — | — | +1 | +7 |
| Δ Stress at Yield (grease-aged) (%) | +12 | +2 | — | — | +5 | −0.1 |
| Δ Strain at Yield (grease-aged) (%) | +9 | +53 | — | — | −29 | −29 |
| Δ Stress at Break (grease-aged) (%) | — | — | — | — | +7 | −12 |

TABLE 2-continued

| Properties of CS1-CS4, S1, and S2 | | | | | | |
|---|---|---|---|---|---|---|
| | CS1 | CS2 | CS3 | CS4 | S1 | S2 |
| Δ Strain at Break (grease-aged) (%) | +15 | +47 | — | — | −8 | +1 |
| Extrusion Melt Breakage | Pass | Fail[a] | Fail[b] | Fail[c] | Pass | Pass |

[a]Screw Speed 10 rpm; Tm 253° C., Break at 120 ft/min, 4.37 g/min.
[b]Screw Speed 10 rpm; Tm 258° C., Break at 140 ft/min, 3.69 g/min.
[c]Screw Speed 10 rpm; Tm 258° C., Break at 100 ft/min, 4.04 g/min.

Desirable properties for the polymeric compositions of the present disclosure include extrusion speed, shrinkage, mechanical properties (T&E) and property retention after gel aging to similar to incumbent PBT. However, a lower modulus than PBT is desirable for flexibility. Samples S1 and S2 show tensile properties (T&E) equivalent or better with both exhibiting a lower modulus relative to PBT. In addition, S1 and S2 pass the extrusion melt breakage test and show post shrinkage values in a similar range to PBT with acceptable gel aging property retention.

Example 2

Prepare thirteen Samples (S3-S14) using the blending procedure provided above in Example 1 and the formulations provided below in Table 3.

TABLE 3

| Compositions of S3-S14 | | | | | | | | | | | | |
|---|---|---|---|---|---|---|---|---|---|---|---|---|
| | S3 | S4 | S5 | S6 | S7 | S8 | S9 | S10 | S11 | S12 | S13 | S14 |
| Crastin 6134 (wt %) | 70.85 | 78.89 | 70.85 | 78.89 | 70.85 | 78.89 | 70.85 | 70.85 | 70.85 | 69.96 | 70.98 | 70.85 |
| LDPE (wt %) | 25.94 | 18.57 | — | — | 24.53 | 17.57 | — | — | — | 25.94 | 26.02 | 15.56 |
| POE (wt %) | — | — | 25.94 | 18.57 | — | — | — | — | — | — | — | — |
| DMDC 1250 (wt %) | — | — | — | — | — | — | — | — | — | — | — | 10.38 |
| ASPUN 6850A (wt %) | — | — | — | — | — | — | 25.94 | — | — | — | — | — |
| ASPUN 6835A (wt %) | — | — | — | — | — | — | — | 25.94 | — | — | — | — |
| LLDPE (wt %) | — | — | — | — | — | — | — | — | 25.94 | — | — | — |
| Amplify TY1053H (wt %) | 2.36 | 1.69 | 2.36 | 1.69 | 3.76 | 2.69 | 2.36 | 2.36 | 2.36 | 2.36 | 2.36 | 2.36 |
| Amplify GR 216 (wt %) | — | — | — | — | — | — | — | — | — | — | — | — |
| CaCO3 (wt %) | — | — | — | — | — | — | — | — | — | 1.10 | — | — |
| NA11 (wt %) | 0.21 | 0.21 | 0.21 | 0.21 | 0.21 | 0.21 | 0.21 | 0.21 | 0.21 | — | — | 0.21 |
| Irganox 1010 | 0.43 | 0.43 | 0.43 | 0.43 | 0.43 | 0.43 | 0.43 | 0.43 | 0.43 | 0.43 | 0.43 | 0.43 |
| Irgafos168 | 0.21 | 0.21 | 0.21 | 0.21 | 0.21 | 0.21 | 0.21 | 0.21 | 0.21 | 0.21 | 0.21 | 0.21 |

Analyze S3-S14 for hot aged shrinkage, room temperature shrinkage, and melt index according to the Test Methods provided above. Additionally, analyze ULTRADUR B 6550 and CRASTLIN 6134 for the same properties. The results are provided in Table 4, below.

TABLE 4

| Properties of S3-S14 | | | | | | | | | | | | | | |
|---|---|---|---|---|---|---|---|---|---|---|---|---|---|---|
| | Ultradur | Crastlin | S3 | S4 | S5 | S6 | S7 | S8 | S9 | S10 | S11 | S12 | S13 | S14 |
| Hot aged shrink (%) | 1.8 | 1.2 | 1.6 | 1.7 | 1.4 | 1.7 | 1.6 | 1.7 | 2 | 1.8 | 1.8 | 1.7 | 1.8 | 1.4 |
| RT shrink (wt %) | 0.11 | 0.17 | 0.23 | 0.17 | 0.23 | 0.23 | 0.23 | 0.23 | 0.28 | 0.34 | 0.46 | 0.34 | 0.34 | 0.34 |
| Melt Index @ 250 C. (g/10 min.) | 9.5 | 33.5* | 15.5 | 21.0 | 20.8 | 23.8 | 14.4 | 18.8 | — | — | — | — | — | — |

*as reported in supplier product data sheet

The melt-flow data in Table 4, above, show significant directional increase in material viscosity with the proposed approach despite the starting material being a low viscosity PBT. High viscosity is desired for tube dimensional stability during high speed extrusion.

Example 3

Prepare ten Samples (S15-S24) using the blending procedure provided above in Example 1 and the formulations provided below in Table 5.

TABLE 5

| Compositions of S15-S24 | | | | | | | | | | |
|---|---|---|---|---|---|---|---|---|---|---|
| | S15 | S16 | S17 | S18 | S19 | S20 | S21 | S22 | S23 | S24 |
| Crastin 6134 (wt %) | 85.53 | 50.83 | 70.85 | 70.85 | 56.86 | 51.83 | 42.36 | 28.85 | 51.42 | 42.03 |
| LDPE (wt %) | 9.92 | 44.62 | 27.30 | 20.30 | 23.63 | 26.56 | 31.99 | 39.94 | 26.35 | 31.74 |
| POE (wt %) | | | | | | | | | | |
| DMDC 1250 (wt %) | | | | | 16.30 | 18.33 | 22.05 | 27.55 | 18.18 | 21.90 |
| ASPUN 6850A (wt %) | | | | | | | | | | |
| ASPUN 6835A (wt %) | | | | | | | | | | |
| LLDPE (wt %) | | | | | | | | | | |
| Amplify TY1053H (wt %) | 3.70 | 3.7 | 1.00 | 8.00 | 2.36 | 2.43 | 2.64 | 2.69 | 2.40 | 2.61 |
| Amplify GR 216 (wt %) | | | | | | | | | | |
| CaCO3 (wt %) | | | | | | | | | 1.00 | 1.01 |
| NA11 (wt %) | 0.21 | 0.21 | 0.21 | 0.21 | 0.21 | 0.21 | 0.24 | 0.24 | | |
| Irganox 1010 | 0.43 | 0.43 | 0.43 | 0.43 | 0.43 | 0.43 | 0.48 | 0.49 | 0.43 | 0.47 |
| Irgafos168 | 0.21 | 0.21 | 0.21 | 0.21 | 0.21 | 0.21 | 0.24 | 0.24 | 0.22 | 0.24 |

Analyze S15-S24 for hot aged shrinkage, room temperature shrinkage, and melt index according to the Test Methods provided above. The results are provided in Table 6, below.

TABLE 6

| Properties of S15-S24 | | | | | | | | | | |
|---|---|---|---|---|---|---|---|---|---|---|
| | S15 | S16 | S17 | S18 | S19 | S20 | S21 | S22 | S23 | S24 |
| Hot aged shrink (%) | 1.0 | 1.0 | 1.0 | 1.1 | 1.39 | 1.56 | 1.04 | 1.04 | 1.04 | 1.04 |
| RT shrink (wt %) | 0.41 | .41 | 0.35 | .52 | 0.17 | 0.23 | 0.17 | 0.23 | 0.17 | 0.17 |
| Melt Index @ 250 C. (g/10 min.) | 25.1 | — | 22.0 | 14.0 | 11.2 | 8.10 | 6.16 | 5.34 | 8.11 | 6.17 |

The melt-flow data in Table 6, above, show the same significant directional increase in material viscosity with the proposed approach despite the starting material being a low viscosity PBT. High viscosity is desired for tube dimensional stability during high speed extrusion.

Example 4

Analyze CS1-CS3 and S1-S14 using the melt breakage test described in the Test Methods section, above. The results are provided in Table 7, below.

TABLE 7

| Melt Breakage of CS1-CS3 and S1-S14 | | | | | | | | | | |
|---|---|---|---|---|---|---|---|---|---|---|
| Sample | Zone 1 | Zone 2 | Zone 3 | Zone 4 | Pressure (psi) | Melt Temp (° C.) | Melt Breakage Speed (ft/min) | Distance die tip to water (cm) | Screw RPM | g/min. |
| CS1 | 230 | 240 | 250 | 220 | 1450 | 247 | None | 12 | 20 | 8.41 |
| | 230 | 240 | 250 | 220 | 830 | 249 | None | 12 | 10 | 3.71 |
| | 230 | 240 | 250 | 220 | 500 | 256 | None | 12 | 5 | 1.75 |
| CS2 | 230 | 240 | 250 | 220 | 700 | 256 | None | 12 | 20 | 8.49 |
| | 230 | 240 | 250 | 220 | 390 | 256 | None | 12 | 10 | 3.43 |
| | 230 | 240 | 250 | 220 | 270 | 256 | None | 12 | 5 | 1.83 |

TABLE 7-continued

Melt Breakage of CS1-CS3 and S1-S14

| Sample | Zone 1 | Zone 2 | Zone 3 | Zone 4 | Pressure (psi) | Melt Temp (° C.) | Melt Breakage Speed (ft/min) | Distance die tip to water (cm) | Screw RPM | g/min. |
|---|---|---|---|---|---|---|---|---|---|---|
| CS3 | 230 | 240 | 250 | 220 | 980 | 246 | 110 | 12 | 20 | 6.76 |
| S1 | 230 | 240 | 250 | 220 | 630 | 256 | None | 12 | 20 | 7.55 |
|  | 230 | 240 | 250 | 220 | 410 | 256 | None | 12 | 10 | 3.84 |
|  | 230 | 240 | 250 | 220 | 280 | 256 | None | 12 | 5 | 1.93 |
| S2 | 230 | 240 | 250 | 220 | 580 | 256 | None | 12 | 20 | 7.67 |
|  | 230 | 240 | 250 | 220 | 380 | 256 | None | 12 | 10 | 3.44 |
|  | 230 | 240 | 250 | 220 | 250 | 256 | None | 12 | 5 | 1.88 |
| S3 | 230 | 240 | 250 | 220 | 790 | 252 | None | 12 | 20 | 7.1 |
|  | 230 | 240 | 250 | 220 | 520 | 252 | None | 12 | 10 | 3.7 |
|  | 230 | 240 | 250 | 220 | 390 | 252 | None | 12 | 5 | 2.0 |
| S4 | 230 | 240 | 250 | 220 | 750 | 252 | None | 12 | 20 | 8.3 |
|  | 230 | 240 | 250 | 220 | 480 | 252 | None | 12 | 10 | 4.0 |
|  | 230 | 240 | 250 | 220 | 290 | 252 | None | 12 | 5 | 1.8 |
| S5 | 230 | 240 | 250 | 220 | 800 | 257 | None | 12 | 20 | 6.3 |
|  | 230 | 240 | 250 | 220 | 550 | 257 | None | 12 | 10 | 3.1 |
|  | 230 | 240 | 250 | 220 | 380 | 257 | None | 12 | 5 | 1.8 |
| S6 | 230 | 240 | 250 | 220 | 850 | 256 | None | 12 | 20 | 7.0 |
|  | 230 | 240 | 250 | 220 | 550 | 256 | None | 12 | 10 | 3.4 |
|  | 230 | 240 | 250 | 220 | 390 | 256 | None | 12 | 5 | 2.1 |
| S7 | 230 | 240 | 250 | 220 | 820 | 255 | None | 12 | 20 | 6.9 |
|  | 230 | 240 | 250 | 220 | 550 | 255 | None | 12 | 10 | 3.4 |
|  | 230 | 240 | 250 | 220 | 390 | 255 | None | 12 | 5 | 2.1 |
| S8 | 230 | 240 | 250 | 220 | 820 | 253 | None | 12 | 20 | 7.0 |
|  | 230 | 240 | 250 | 220 | 540 | 253 | None | 12 | 10 | 3.5 |
|  | 230 | 240 | 250 | 220 | 380 | 253 | None | 12 | 5 | 1.9 |
| S9 | 230 | 240 | 250 | 220 | 1000 | 249 | None | 12 | 20 | 11.8 |
|  | 230 | 240 | 250 | 220 | 690 | 249 | None | 12 | 10 | 6.8 |
|  | 230 | 240 | 250 | 220 | 480 | 249 | None | 12 | 5 | 3.6 |
| S10 | 230 | 240 | 250 | 220 | 970 | 256 | None | 12 | 20 | 10.9 |
|  | 230 | 240 | 250 | 220 | 660 | 256 | None | 12 | 10 | 5.8 |
|  | 230 | 240 | 250 | 220 | 450 | 256 | None | 12 | 5 | 3.1 |
| S11 | 230 | 240 | 250 | 220 | 880 | 255 | None | 12 | 20 | 10.3 |
|  | 230 | 240 | 250 | 220 | 610 | 255 | None | 12 | 10 | 6.1 |
|  | 230 | 240 | 250 | 220 | 440 | 255 | None | 12 | 5 | 3.4 |
| S12 | 230 | 240 | 250 | 220 | 1000 | 253 | None | 12 | 20 | 7.4 |
|  | 230 | 240 | 250 | 220 | 690 | 253 | None | 12 | 10 | 4.1 |
|  | 230 | 240 | 250 | 220 | 480 | 253 | None | 12 | 5 | 2.2 |
| S13 | 230 | 240 | 250 | 220 | 970 | 253 | None | 12 | 20 | 7.1 |
|  | 230 | 240 | 250 | 220 | 660 | 253 | None | 12 | 10 | 4.1 |
|  | 230 | 240 | 250 | 220 | 450 | 253 | None | 12 | 5 | 2.2 |
| S15 | 230 | 240 | 250 | 220 | 880 | 255 | None | 12 | 20 | 7.3 |
|  | 230 | 240 | 250 | 220 | 610 | 255 | None | 12 | 10 | 4.1 |
|  | 230 | 240 | 250 | 220 | 440 | 255 | None | 12 | 5 | 2.3 |

Example 5

Analyze S15-S24 using the melt breakage test described in the Test Methods section, above. The results are provided in Table 8, below.

TABLE 8

Melt Breakage of S15-S24

| Sample | Zone 1 | Zone 2 | Zone 3 | Zone 4 | Pressure (psi) | Melt Temp (° C.) | Melt Breakage Speed (ft/min) | Distance die tip to water (cm) | Screw RPM | g/min. |
|---|---|---|---|---|---|---|---|---|---|---|
| S15 | 230 | 240 | 250 | 220 | 200 | 263 | None | 12 | 5 | 0.97 |
| S16 | 230 | 240 | 250 | 220 | 280 | 263 | None | 12 | 5 | 2.3 |
| S17 | 230 | 240 | 250 | 220 | 180 | 267 | None | 12 | 5 | 1.42 |
| S18 | 230 | 240 | 250 | 220 | 200 | 267 | None | 12 | 5 | 1.6 |
| S19 | 230 | 240 | 250 | 220 | 260 | 274 | 120 | 12 | 5 | 1.58 |
| S20 | 230 | 240 | 250 | 220 | 280 | 260 | 150 | 12 | 5 | 1.59 |
| S21 | 230 | 240 | 250 | 220 | 380 | 261 | 130 | 12 | 5 | 2.18 |
| S22 | 230 | 240 | 250 | 220 | 390 | 258 | 120 | 12 | 5 | 2.06 |
| S23 | 230 | 240 | 250 | 220 | 280 | 256 | 160 | 12 | 5 | 1.62 |
| S24 | 230 | 240 | 250 | 220 | 400 | 254 | 120 | 12 | 5 | 2.43 |

The invention claimed is:

1. A polymeric composition, comprising:
   69 wt % to 80 wt % of a polybutylene terephthalate;
   15 wt % to 26 wt % of a low-density polyolefin of a low-density polyethylene, wherein the low-density polyethylene is a high-pressure, low-density polyethylene having a density of less than 0.928 g/cm³ and a melt index of at least 2.0 g/10 min. when measured at 190° C. using a 2.16 Kg weight; and a maleated ethylene-based polymer, wherein the weight percentages are based on the combined weight of the polybutylene terephthalate, the low-density polyolefin, and the maleated ethylene-based polymer.

2. The polymeric composition of claim 1, further comprising an additional component selected from a high-density polyethylene having a density of at least 0.940 g/cm', a polyethylene terephthalate, a polyamide, or combinations of two or more thereof.

3. The polymeric composition of claim 2, wherein the polybutylene terephthalate has a melt index of greater than 10 g/10 min., when measured at 250° C. using a 2.16 Kg weight.

4. The polymeric composition of claim 3, wherein the maleated ethylene-based polymer has a density of at least 0.930 g/cm³.

5. The polymeric composition of claim 4, wherein the maleated ethylene-based polymer is a high-density polyethylene having a density of at least 0.94 g/cm³ and has a maleic anhydride content of at least 0.5 weight percent based on the entire weight of the maleated ethylene-based polymer.

6. An extruded optical cable protective component comprising the polymeric composition of claim 1.

7. An optical fiber cable, comprising:
(a) the extruded optical fiber cable protective component of claim 6; and
(b) at least one optical fiber transmission medium.

* * * * *